Oct. 8, 1929.  J. A. THOMAS  1,731,184
NEEDLE VALVE
Filed Oct. 15, 1927  2 Sheets-Sheet 1
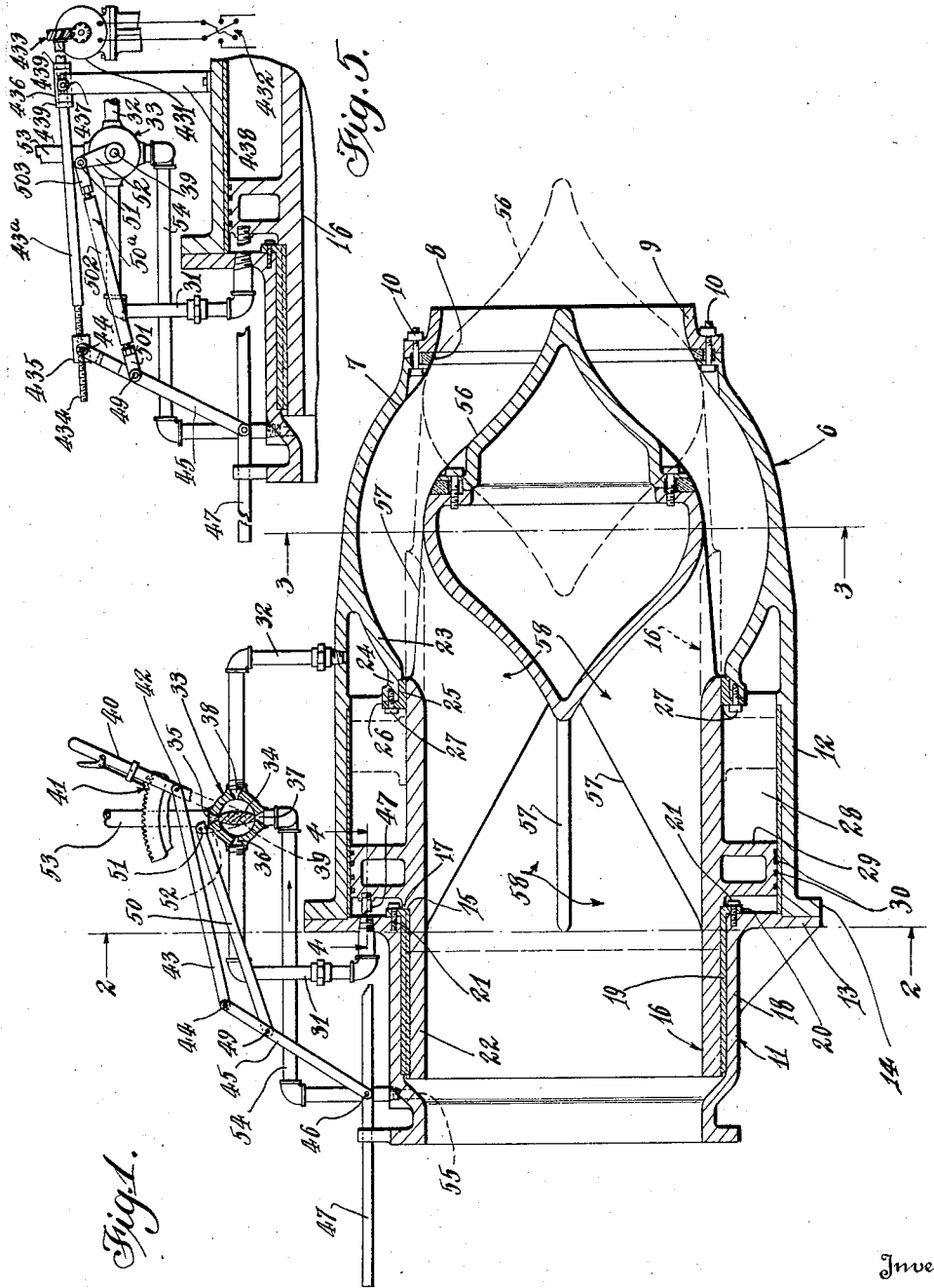
Inventor
James A. Thomas
By Lyon & Lyon
Attorneys Oct. 8, 1929.  J. A. THOMAS  1,731,184
NEEDLE VALVE
Filed Oct. 15, 1927   2 Sheets-Sheet 2

Inventor
James A. Thomas
By Lyon & Lyon
Attorneys

Patented Oct. 8, 1929

1,731,184

UNITED STATES PATENT OFFICE

JAMES A. THOMAS, OF LOS ANGELES, CALIFORNIA, ASSIGNOR TO LLEWELLYN IRON WORKS, OF LOS ANGELES, CALIFORNIA, A CORPORATION OF CALIFORNIA

NEEDLE VALVE

Application filed October 15, 1927. Serial No. 226,287.

This invention relates to needle valves and, more especially, to that class of needle valves in which the valve plug is moved into different positions by pressure of the fluid whose flow is controlled by the valve.

An object of the present invention is to effect automatic return of the valve plug to the position to which it has been adjusted, when leakage between the valve plug and valve chamber has effected movement of the valve plug to pass more or less fluid than is possible with the valve plug in said position.

An important object of the invention is to make provision for regulating the position of the valve plug by a combined manually and automatically controlled mechanism.

Another object is to produce a valve of this type of comparatively simple construction.

Another object is reliability and uniformity of operation.

Another object is to make provision in a valve of this type for maintaining the valve plug in axial alinement with the valve seat so as to secure perfect seating of the valve plug when it moves into closed position.

Other objects and advantages will appear in the subjoined detailed description.

The accompanying drawings illustrate the invention.

Figure 1 is a longitudinal view, mainly in mid-section, of a needle valve constructed in accordance with the provisions of this invention.

Figure 5 is a view illustrating in section a fragment of the valve chamber and illustrating the mechanism for operating the valve plug, some of the elements of said mechanism being modified to provide for the application of motor power to effect initial operation of the valve plug into its various positions.

Figure 4:
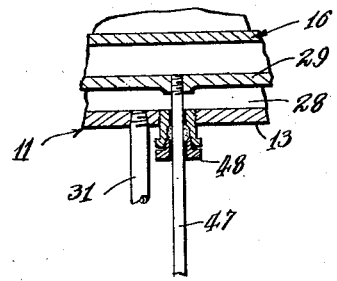
Figure 4 is a horizontal fragmental sectional detail on the line indicated by 4—4, Figure 1.
Figure 2:
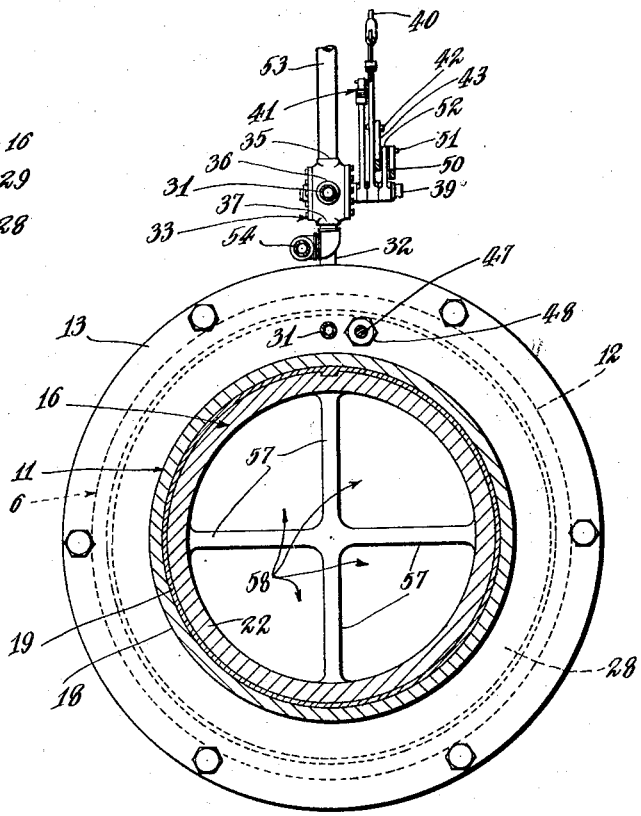
Figure 2 is a vertical view, partly in section, looking in the direction of the arrows from the line indicated by 2—2, Figure 1.
Figure 3:
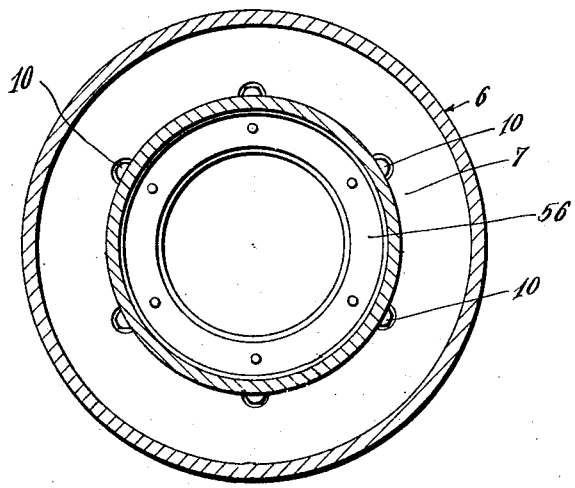
Figure 3 is a vertical section on the line indicated by 3—3, Figure 1.

There is provided a valve chamber 6, mainly of cylindrical form and contracted at one end as indicated at 7. The contracted end 7 is provided with an annular valve seat 8, said seat being clamped between the contracted end of the valve chamber 6 and an annular member 9 which is secured in place by bolts 10. The valve chamber 6 has its other end formed by a portion 11 which is of smaller diameter than the main body 12 of the valve chamber, the portion 11 and body 12 being connected by an external annular flange 13 which is bolted or otherwise secured to an annular flange 14 on the body 12.

That portion of the flange 13 that extends inwardly from the body 12 forms an annular shoulder 15 that constitutes a stop to limit opening movement of the valve plug which is indicated, in general, by the character 16. When the valve plug 16 is in its maximum open position, an external annular shoulder 17 on said valve plug engages the shoulder 15. In this particular instance the valve chamber portion 11 is formed in sections, an outer section 18 and an inner section or bushing 19 which has an outwardly projecting annular flange 20 at its inner end secured by screws 21 to the section 18. The valve plug 16 is provided with a cylindrical portion 22 which extends forwardly and rearwardly of the piston and slidably fits inside of the bushing 19, thus to hold the rear end of the valve plug axially alined with the seat 8.

Forwardly of the flange 13, the valve chamber body 12 is provided with an inwardly and rearwardly projecting flange 23, terminating in an annular portion which, in this instance, comprises an outer sleeve 24 and an inner bushing 25 which is provided with an annular flange 26 secured by screws 27 to the end of the sleeve 24. The cylindrical valve plug portion 22 slidably fits within the bushing 25 and, thus, the forward portion of the valve plug is held in axial alinement with the valve seat 8. An advantage of having the valve plug thus slidably fitting the valve chamber at widely separated points on opposite sides of the piston is that the plug will always move accurately onto its seat 8. As the valve plug portion 22 is of considerably less diameter than the chamber body 12, it will be seen that there is formed between the body 12 and the valve plug portion 22 an annular space 28 which works an annular enlargement 29 of the valve plug, said enlargement 29 projecting from and, in this instance, formed integral with the cylindrical valve plug portion 22. The enlargement 29 constitutes a piston and, if desired, said piston may be provided with annular packing rings 30, so as to minimize leakage between it and the wall of the body 12 which it fits and which thus functions as a cylinder. The piston divides the bore of the cylinder into two pressure chambers, both of which are out of direct communication with the bore of the valve plug 16.

Communicating with opposite ends of the annular space 28 are fluid pressure conduits 31, 32, respectively, one of said conduits at different times admitting fluid to and exhausting fluid from the space 28 on one side of the piston and the other conduit admitting fluid to and exhausting fluid from the space 28 on the other side of the piston.

The conduits 31, 32 connect with a valve chamber 33 in which is mounted a rotary valve member 34 adapted to control ports 35, 36, 37, 38 in the valve chamber 33. The port 35, 37 are opposite one another and the ports 36, 38 are opposite one another and approximately ninety degrees of circular measurement from the ports 35, 37. The valve chamber 33 and valve member 34 together constitute a four-way valve, a type of valve that is well understood in the art relating thereto. The valve member 34 may be turned to positions to communicate the port 38 with the port 36 and the port 37 with the port 38 or to communicate the port 36 with the port 37 and the port 35 with the port 38. The turning axis of the valve member 33 is indicated at 39 and to it is fixed an arm 52.

A rod 47 passes through a stuffing box 48, with which the flange 13 is provided, into the annular space 28 and the inner end of said rod is connected in any suitable manner with the piston 29 so that said rod 47 will follow the movements of the piston. Pivoted at 46 to the rod 47 is a link 45 which functions as a lever to either operate the rod 47 to cause movement of the valve plug, or to be operated by said rod when the rod is moved by the piston as will be made clear hereinafter.

The lever 45 is connected with the arm 52, being pivoted at 49, either to a link 50 as in Figure 1 or to a link 50ª as in Figure 5. The link 50 or 50ª, as the case may be, is pivoted at 51 to the arm 52. The link 50ª, in this instance, can be adjusted as to length and, therefore, comprises relatively adjustable sections 501, 502, 503. The section 502 has its end portions in threaded engagement with the sections 501, 503, one of the threads being right hand and the other left hand.

The lever 45 is connected at its outer end with a manual control. For example, the lever 45 is pivotally connected at 44, either to a link 43 as in Figure 1 or to a link 43ª as in Figure 5. In Figure 1 the manual control is direct as the link 43 is pivoted at 42 to a manual operating member 40 which is fixed to the axis 39 and which may be selectively held in different positions by reason of the well known detent and quadrant device 41 or its equivalent. In Figure 5 the manual control is a remote control as the link 43ª constitutes a screw shaft operated by a motor 431 controlled by a reversing switch 432. Suitable gearing 433 connects the motor 431 and shaft 43ª. The screw threads 434 of the shaft 43ª engage in a nut 435 to which the pivot 44 connects the lever 45.

The shaft 43ª turns in an oscillatably mounted bearing 436 provided with trunnions 437, only one of which can be seen from the nature of the view Figure 5. The trunnions 437 are supported on the upper end of a standard 438 which may be mounted on the valve chamber 7. The shaft 43ª may be held against endwise movement in the bearing 437 by collars 439 on said shaft at opposite ends of the bearing 437.

The conduit 31 communicates with the valve chamber 33 through the port 36 and the conduit 32 communicates with the valve chamber 33 through the port 38. The port 35 communicates an exhaust conduit 53 with the chamber 33. The port 37 communicates a fluid pressure conduit 54 with the valve chamber 33 and the conduit 54 communicates at one end, through a port 55, with the interior of the valve chamber 6 rearwardly of the valve plug. Thus, both pressure chambers of the cylinder are out of communication with the bore of the valve plug 16 unless the valve 34 is in a position to communicate the port 37 with either the port 36 or the port 38.

The head 56 of the valve plug is tapered as is the bore of the seat 8 so that said seat and bore will closely fit when the valve plug is in its closed position which position is indicated in dotted lines in Figure 1. The head 56, in this instance, is hollow and is only connected with the cylindrical portion 22 by ribs 57, the inter-rib spaces 58 affording passages through which the fluid, being controlled by the needle valve, can flow from within the cylindrical portion 22 to the space between the plug head 56 and valve chamber 6.

The invention described above operates as follows:

Assuming that the ports 35, 37 of the four-way valve are closed and the ports 36, 38 are open, as shown in Figure 1, and that the valve plug 16 is open as indicated in solid lines in Figure 1, the operator may cause the valve plug 16 to move toward the closed position by moving the operating member 40 to the left, or throwing the switch 432 in the appropriate position to effect a corresponding movement of the link 45, thereby opening the ports 35, 37. As soon as this is done, the fluid under whatever pressure it has within the valve chamber 6 will flow through the conduit 34 into the valve chamber 33, thence through the conduit 31 into that part of the cylinder chamber 38 that is between the piston 29 and flange 13, thus forcing the piston to the right in Figure 1. This movement of the piston 29 carries the rod 47 with it and, therefore, swings the link 45 around the pivot 44 which, at this time, is a fulcrum point. The result is that the link 50 in Figure 1 or link $50^a$ in Figure 5 is moved to the right so as to effect closing of the ports 35, 37, thus discontinuing discharge of fluid from the conduit 31 into the cylinder chamber 28 and discharge from said cylinder chamber of fluid through the conduit 32. Accordingly, the piston 29 will tend to remain stationary so as to hold the valve plug in the position to which it has been moved by the fluid pressure.

Leakage of fluid between the valve plug portion 16 and the chamber portion 18 is likely to occur and, accordingly, the piston 29 will be slowly moved to the right or left and thus change the setting of the valve plug. However, as soon as this occurs, the rod 47, which follows the piston to the right or left moves the link 50 into position to communicate the ports 37, 38 or the ports 36, 37, as the case may be, and thus discharges fluid from the valve chamber 33 into the conduit 32 or 31, thence into that portion of the cylinder chamber 28 that is on the right or left of the piston 29. This fluid propels the piston 29 to the left or right, as the case may be, and this, in turn, moves the link 50 in a direction to again close the ports 35, 37. Thus, the valve plug will always be returned to the position to which it has been adjusted by the positioning of the operating member 40 along the quadrant or the nut 435 along the shaft $43^a$.

The farther to the left the operating member 40 is swung in Figure 1, or the nut 435 is shifted in Figure 5, the farther the valve member 34 will be turned in a counter-clockwise direction and, consequently, the greater the interval of time it will take for the rod 47 to shift to a position that will turn the valve member 34, clockwise into position to close the ports 35, 37. Thus the farther the operating member 40 is moved to the left, the farther the valve plug 16 will be propelled toward the closed position and, if the operating member 40 or nut 435 is moved to its extreme left hand position the valve plug will be moved into position to close on the seat 8 before the ports 35, 37 are closed by the valve member 33.

If the valve plug be in closed position with the operating member 40 or shaft $43^a$ in a position to correspond, the operator may effect opening of the valve plug by moving said operating member to the right or operating the motor in a direction to shift the nut 435 to the right, the extreme right hand position of the operating member 40, as in Figure 1, or nut 435, as in Figure 5, corresponding to the full open position of the valve plug.

When the operating member or nut is thus moved to the right it causes the four-way valve 33 to be operated to discharge fluid into the space 28 in front of the piston and thus force said piston to the left. At the same time the fluid in rear of the piston is discharged through the conduit 31 and valve 33 into the conduit 53.

It will be seen that the valve means comprising the elements 33, 34 is operable into one of the number of positions to simultaneously exhaust fluid from the left end of the cylinder and induct fluid to the right end of said cylinder, that said valve means is operable into a second position to simultaneously induct fluid to the left end of the cylinder and exhaust fluid from the right end of said cylinder, and that said valve means is operable into a third or neutral position to shut off the flow of fluid to and from the cylinder. In this instance the neutral position is the intermediate position of the valve means. It will also be understood that the manual control means, comprising, on the one hand, the elements 39, 40, 41, 42, 43, 44, 45, 46, 49, 50, 51 and, on the other hand, the elements $43^a$, 44, 45, 46, 49, $50^a$, 51, 431, 432, 433, 434, 435, 436, 437, 438, 439, effects operation of the valve means 33, 34 into the different positions mentioned.

The rod 47 constitutes one form of means, operable by movement of the piston in either direction when the valve means 33, 34 is operated from the third position into the first or second position, to operate the manual control means 33, 34, in a direction to effect return of the valve means to the third position.

I claim:

1. A needle valve comprising a valve chamber provided with a valve seat, a valve plug provided with a cylindrical portion slidably fitting in the valve chamber, said valve plug provided with a head to close on the valve seat and connected with the cylindrical portion by ribs, the inter-rib spaces affording passage for fluid from the interior of the cylindrical portion to the valve chamber, there being an annular space between the cylindrical portion and a portion of the wall of the valve chamber, said space being closed at its ends, a piston on the valve plug projecting into said space, said cylindrical portion slidably fitting the valve chamber on opposite sides of the piston, and a means to induct fluid to and exhaust fluid from the cylinder on each side of the piston.

2. A needle valve comprising a valve chamber provided with a valve seat and provided with a body and provided with a portion of less inside diameter than said body, the body provided with inwardly projecting flanges, one of said flanges connecting the body and said portion, a valve plug provided with a cylindrical portion slidably fitting in the other flange and in the portion of reduced diameter, the body spaced from the cylindrical portion to form an annular cylinder chamber, said chamber being closed at its opposite ends, a piston projecting from the cylindrical portion into the space and in sliding engagement with the body, said cylindrical portion slidably fitting the valve chamber on opposite sides of the piston and a means to induct fluid to and exhaust fluid from the cylinder chamber on each side of the piston, the valve plug provided with a head to close on the valve seat and provided with spaced ribs connecting the head with the cylindrical portion, the inter-rib spaces affording passage for fluid from the interior of the cylindrical portion to the valve chamber.

Signed at Los Angeles, Calif., this 16th day of Sept., 1927.

JAMES A. THOMAS.